US010394195B2

(12) United States Patent
Das et al.

(10) Patent No.: US 10,394,195 B2
(45) Date of Patent: Aug. 27, 2019

(54) SYSTEMS AND METHODS FOR MANUFACTURING OPTIMIZATION

(71) Applicants: Aditya Narayan Das, Irving, TX (US); Philip J. Stephanou, Mountain View, CA (US)

(72) Inventors: Aditya Narayan Das, Irving, TX (US); Harry E. Stephanou, Fort Worth, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1652 days.

(21) Appl. No.: 14/062,183

(22) Filed: Oct. 24, 2013

(65) Prior Publication Data

US 2014/0121820 A1 May 1, 2014

Related U.S. Application Data

(60) Provisional application No. 61/719,152, filed on Oct. 26, 2012.

(51) Int. Cl.
*G05B 13/04* (2006.01)
*G05B 19/4097* (2006.01)

(52) U.S. Cl.
CPC ......... *G05B 13/04* (2013.01); *G05B 19/4097* (2013.01); *G05B 2219/32204* (2013.01); *G05B 2219/49008* (2013.01); *Y02P 90/22* (2015.11)

(58) Field of Classification Search
CPC ...... G05B 13/04; G05B 19/4097; Y02P 90/22
USPC ....................................................... 700/182
See application file for complete search history.

(56) References Cited

U.S. PATENT DOCUMENTS

| 5,610,823 A * | 3/1997 | Gregory | G05B 19/184 |
| | | | 318/561 |
| 6,198,980 B1 * | 3/2001 | Costanza | G05B 19/41865 |
| | | | 700/97 |
| 7,991,581 B2 | 8/2011 | Bihlmaier et al. | |
| 8,775,148 B2 * | 7/2014 | Pannese | G05B 15/02 |
| | | | 703/13 |
| 2003/0004595 A1 * | 1/2003 | Seimiya | G06Q 10/087 |
| | | | 700/97 |
| 2003/0130758 A1 * | 7/2003 | Hirano | G05B 19/4097 |
| | | | 700/182 |
| 2004/0148047 A1 | 7/2004 | Dismukes et al. | |

(Continued)

FOREIGN PATENT DOCUMENTS

KR 0102086 A 9/2010

OTHER PUBLICATIONS

Das, et al., "Design for Micromanufacturability", LASTWord in MICROmanufacturing magazine, Nov./Dec. Issue, 2010.
Das, et al., "Design for Micromanufacturability", Commericialization of Micro-Nano Systems Conference (COMS), Albuquerquie, New Mexico, USA, Aug.-Sep. 2010.
Das, et al., Design of Microassembly through Process Modeling in Virtual Reality, Microtech conference and expo, Boston, MA, USA, Jun. 2011.

(Continued)

*Primary Examiner* — Vincent H Tran
(74) *Attorney, Agent, or Firm* — Thomas | Horstmeyer, LLP

(57) ABSTRACT

In one embodiment, a manufacturing process is optimized by enabling a user to specify a product to be manufactured, enabling the user to specify a manufacturing system for manufacturing the product, enabling the user to select parameters for the product and the manufacturing system, and automatically calculating manufacturing metrics for the manufacturing process based upon the user-specified models and user selections.

26 Claims, 16 Drawing Sheets

(56) References Cited

U.S. PATENT DOCUMENTS

| | | | | |
|---|---|---|---|---|
| 2005/0038553 | A1* | 2/2005 | Sweitzer | G06Q 10/087 700/182 |
| 2005/0165504 | A1* | 7/2005 | Feige | G05B 19/4097 700/97 |
| 2006/0106485 | A1* | 5/2006 | Landers | G05B 19/4097 700/182 |
| 2006/0129462 | A1* | 6/2006 | Pankl | G06Q 30/06 705/26.81 |
| 2006/0161285 | A1* | 7/2006 | Khetan | G06F 17/50 700/108 |
| 2006/0282186 | A1* | 12/2006 | Hansen | B22D 46/00 700/97 |
| 2007/0118487 | A1* | 5/2007 | Grichnik | G06Q 10/04 705/400 |
| 2010/0057237 | A1* | 3/2010 | Kettaneh | G05B 19/41885 700/103 |
| 2010/0305909 | A1* | 12/2010 | Wolper | G06T 17/00 703/1 |
| 2011/0060443 | A1* | 3/2011 | Schwarm | G05B 13/042 700/104 |
| 2011/0202158 | A1* | 8/2011 | Kako | G06F 17/50 700/98 |
| 2012/0165967 | A1* | 6/2012 | St. Ville | A61F 2/30942 700/98 |
| 2012/0303142 | A1* | 11/2012 | Hendler | G05B 19/41875 700/31 |

OTHER PUBLICATIONS

Popa, et al. "M3-Deterministic, Multiscale, Multirobot Platform for Microsystems Packaging: Design and Quasi-Static Precision Evaluation", IEEE Transaction son Automation Science and Engineering (T-ASE), vol. 6, Issue 2, pp. 345-361, 2009.

Das, et al., "A Multiscale Assembly and Packaging System for Manufacturing of Complex Micro-Nano Devices", IEEE Transaction an Automation Science and Engineering, vol. 9, No. 1, Jan. 2012.

Das, et al., "Precision Alignment and Assembly of a Fourier Transform Microspectrometer", International Journal of Micro-Nano (JMNM), vol. 5, No. 1-2, Springer Berlin, pp. 15-28, 2009.

Das, et al., "Autmated Microassembly using Precision based Hyrbrid Control", Proceedings of IEEE International Conference on Robatics and Automation (ICRA), pp. 4106-4112, Alaska, May 2010.

Das, et al., "u3: Multiscale, Deterministic Micro-Nano Assembly System for Construction of On-Wafer Microrobots", Proceedings of IEEE International Conference on Robotics and Automation (ICRA), pp. 461-466, Rome, Italy, Apr. 2007.

Das, et al., "Precision Evaluation of Modular Multiscale Robots for Pet-in-Hole Microassembly Tasks", in Proceedings of International Covnerene on Intelligent Robots and Systems (IROS), San Francisco, CA, pp. 1699-1704, Sep. 2011.

Das, et al., "Precision-Based Robot Path Planning for Microassembly", Proceedings of the 6th IEEE Conference on Automatio Science and Engineering (CASE), pp. 527-532, Canada, Aug. 2010.

* cited by examiner

FIG. 13

SYSTEMS AND METHODS FOR MANUFACTURING OPTIMIZATION

CROSS-REFERENCE TO RELATED APPLICATION(S)

This application claims priority to U.S. Provisional Application Ser. No. 61/719,152, filed Oct. 26, 2012, which is hereby incorporated by reference herein in its entirety.

NOTICE OF GOVERNMENT-SPONSORED RESEARCH

This invention was made with Government support under grant/contract numbers N00014-08-C-0390 and N00012-11-C-0391 awarded by the Office of Naval Research. The Government has certain rights in the invention.

BACKGROUND

Manufacturing processes for complex and heterogeneous systems in sub-millimeter scale require several discontinuous and expensive steps. The batch manufacturing approach via legacy semiconductor processes often does not provide a viable solution for such product development because of its inherent limitations of monolithic and in-plane design or commercial unsuitability in cases of low to medium production volumes. Therefore, alternative approaches, such as flexible manufacturing are needed.

Flexible manufacturing is a form of advanced manufacturing that can potentially enable a giant technological leap over conventional manufacturing approaches using tools dedicated for specific processes. Significant advantages of a flexible manufacturing framework include reduced manufacturing times, lower cost per unit produced, greater labor productivity, greater machine efficiency, reduced parts inventories, adaptability to multiple operations, and shorter lead times.

Unfortunately, major challenges exist to setting up such a versatile manufacturing establishment, including the large implementation cost and substantial pre-planning requirements. Some of the typical aspects that the designers of flexible manufacturing systems must focus on include the selection of granularity for manufacturing components, such as part design, type of tools, number of manipulation systems, category of sub tasks, etc.; seamless integration of multiple diverse processes for a heterogeneous product having parts of different scale, shape, materials, and compliance; seamless transition from product to product at minimum investment and effort; portability of manufacturing; and reliability of the product. These factors depend on numerous input parameters spread over the entire manufacturing process including design, machining, assembly, packaging, testing, and production management. Careful evaluation of these parameters, in a quantitative manner, and generation of a cohesive, optimized configuration of hardware, software, and processes for manufacturing is critical, especially for new product concepts for which off-the-shelf solutions are not yet available.

From the foregoing discussion, it can be appreciated that it would be desirable to have a system and method for optimizing a flexible manufacturing process.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 13 is a screen shot of a page associated with an "About DfM2" sub-tab of a "Help and FAQs" tab of the user interface.

DETAILED DESCRIPTION

As described above, it would be desirable to have a system and method for optimizing a flexible manufacturing process. Disclosed herein are examples of such systems and methods. In one embodiment, the systems and methods incorporate a manufacturing optimization program that is configured to assist a user in defining various parameters for the product to be produced, the manufacturing system to be used to produce the product, and any sensors that are to be used to provide feedback to the manufacturing system. Once these parameters are defined, the program can provide an indication to the user as to various manufacturing metrics, such as process yield, cycle time, overall cost, and product performance. In some embodiments, these cost functions are updated in real time as the user inputs or changes the various manufacturing parameters to provide the user with an indication as to how the user's selections affect the manufacturing cost functions.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
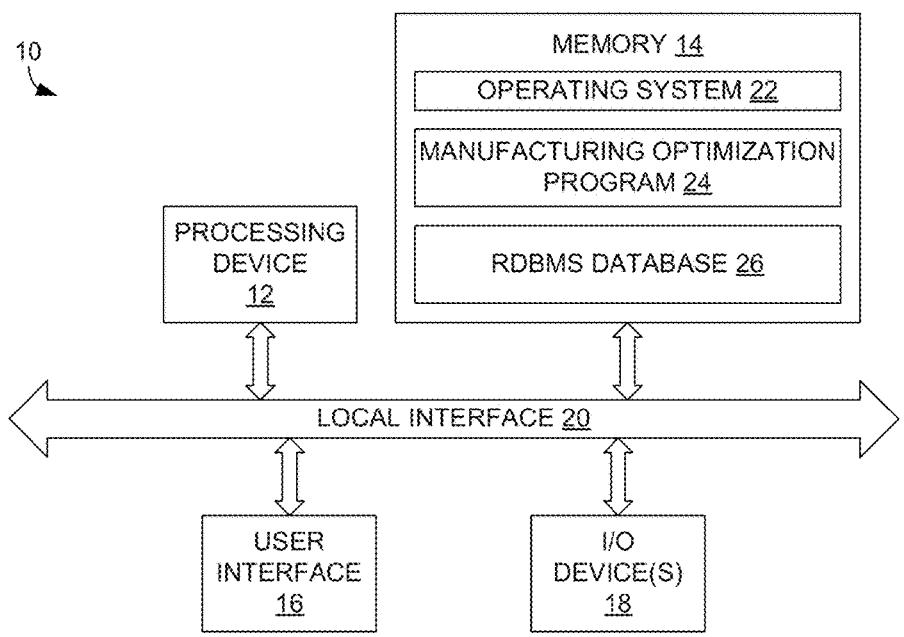
FIG. 1 is a block diagram of an embodiment of a computing device that executes a manufacturing optimization program.

Described below are systems and methods for quantitative optimization for flexible manufacturing applications, for example, in sub-millimeter scales. A key aspect of the systems and methods is the concurrent engineering approach to simultaneously evolve both the product and the system used to manufacture the product. This holistic approach is directed by a fast and reliable modeling of the manufacturing process, in its entirety, by an interactive manufacturing optimization program, which is referred to herein as the "Design for Multiscale Manufacturability" or $DfM^2$. As shown in FIG. 1, this program can reside on a computing device 10 that includes a processing device 12, memory 14, a user interface 16, and at least one I/O device 18, each of which is connected to a local interface 20. The processing device 12 can include a central processing unit (CPU) or a semiconductor-based microprocessor (in the form of a microchip). The memory 14 includes any one of or a combination of volatile memory elements (e.g., RAM) and nonvolatile memory elements (e.g., hard disk, ROM, Flash, etc.). The user interface 16 comprises the components with which a user interacts with the computing device 10, such as a keyboard, keypad, and a display screen, and the I/O devices 18 are adapted to facilitate communications with other devices.

The memory 14 (a non-transitory computer-readable medium) comprises programs (logic) including an operating system 22 and the manufacturing optimization program 24, which may also be referred to herein as a manufacturing optimization system.

In some embodiments, the implementation of the manufacturing optimization program 24 can be used in conjunction with a new class of custom-developed robotic hardware and a distributed intelligence-based adaptive automation technique, both of which are described in detail in U.S. patent application Ser. No. 14/061,063, filed Oct. 23, 2013, which is hereby incorporated by reference into the present disclosure in its entirety. The manufacturing optimization program 24 enables estimation of common manufacturability metrics, such as process yield, cycle time, overall cost, and product performance, which improves the decision making in production and paves the pathway to commercialization by reducing the time and cost to market. In some embodiments, a custom-developed virtual reality simulator module of the manufacturing optimization program 24 enables quick and realistic simulation of automated assembly of the product.

The manufacturing optimization program 24 approaches the holistic analysis by strategically classifying the overall manufacturing process into multiple analytical segments. Each segment operates on a set of internal variables that are quantified by collectively acquiring information from the user and a customized relational database management system (RDBMS), which is also identified in FIG. 1 by reference numeral 26 and can more generally be referred to as a database. As the user inputs the design, working principle, and expected device performance, the RDBMS 26 provides information regarding part machining specifications, compatible material and processes, salary and wages, packaging and marketing costs, preparation time, and so forth. In the manufacturing optimization program 24, the product and the manufacturing system are concurrently evaluated to obtain suitable configurations for both in order to achieve maximum yield with minimum cost and time, while maintaining targeted performance specifications. When provided, the virtual reality simulation module of the manufacturing optimization program 24 can iterate a typical assembly process with different configurations of a manufacturing system in order to validate a necessary and sufficient configuration as obtained analytically in the manufacturing optimization program 24.

The concurrent engineering framework is based upon a quantitative tool called "high yield assembly condition (HYAC)," which suggests that a 99% assembly yield can be obtained if the combined uncertainty of locating and positioning of parts and an end-effector is smaller than the assembly tolerance. A significant modification from the classical robotics, which has been incorporated while implementing the above HYAC, is the redefinition of precision metrics such as resolution, repeatability, and accuracy of robotic systems. The classical definitions for these metrics do not take the precision of the sensor system into consideration. In macro-scale, the sensor precision is generally very high (in the order of few microns) in comparison to the required precision in the robot system (on the order of few millimeters, i.e., 1,000 times less than that of the sensors) and hence any error in sensor positioning and reading can be safely neglected. However, in the micro-domain, the precision requirements are very large (in the order of microns) and thus are significantly affected by the sensor precision. Because of this, the manufacturing optimization program 24 uses the redefined precision metrics, which are essentially represented by Gaussian distributions combining sensor and robot precisions.

Figure 2:
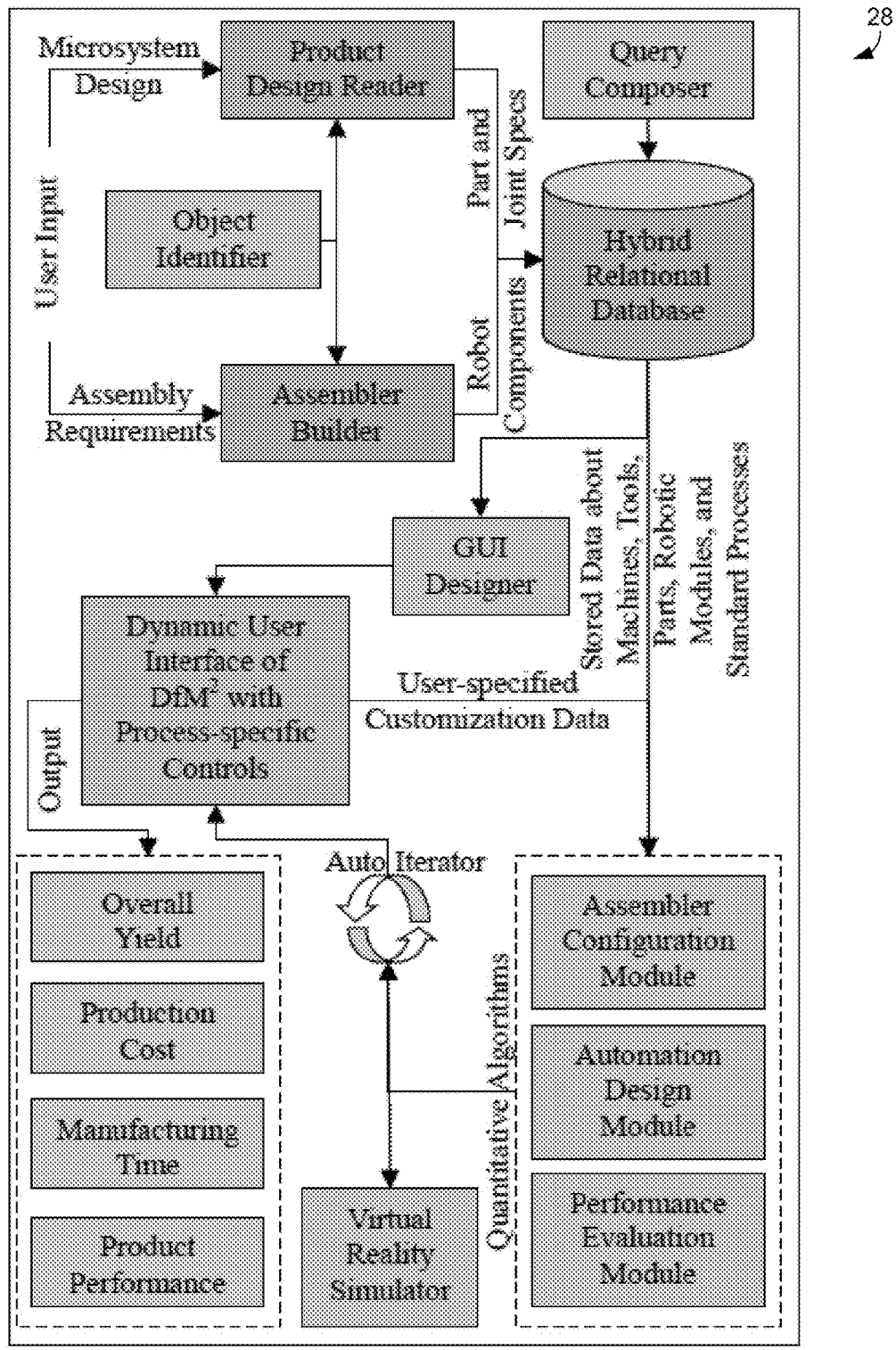
FIG. 2 is an embodiment of a process flow model for the manufacturing optimization program.

An embodiment of the overall architecture of the manufacturing optimization program 24 is illustrated in the process flow model 28 of FIG. 2. The process flow shown in this figure has been significantly simplified, highlighting only the major sections, for easier understanding. As shown in FIG. 2, the manufacturing optimization program 24 is a deterministic and iterative analyzer that provides a forward solution to the manufacturing process, i.e., manufacturability of product design.

Figure 3:
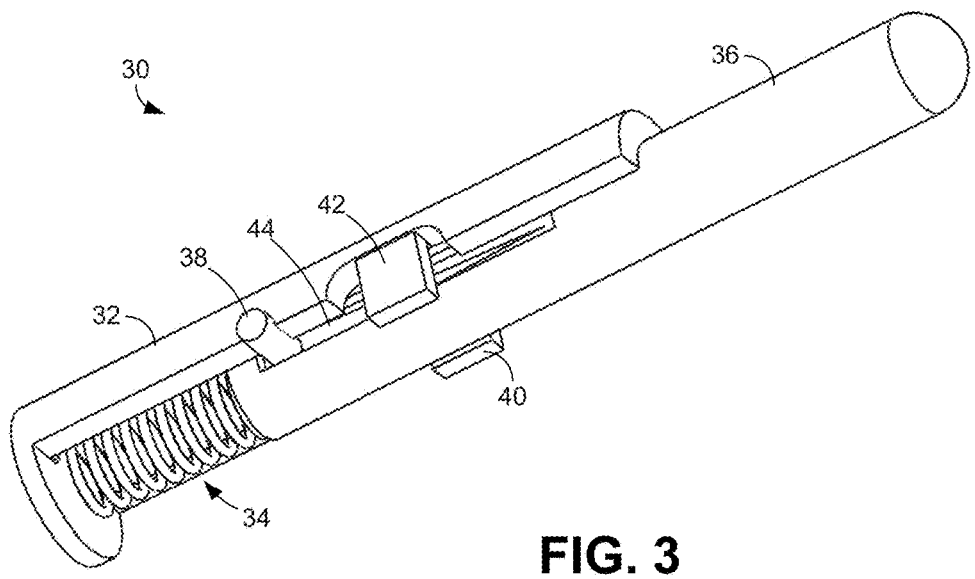
FIG. 3 is a perspective view of an example product whose manufacture can be optimized using the manufacturing optimization program.

The use and operation of the manufacturing optimization program 24 will be discussed in relation to FIGS. 4-16, which show various screen shots of a user interface of the program. In these figures, it is presumed that the product to be manufactured is the displacement sensor 30 shown in FIG. 3, which is presented as a case study. As indicated in FIG. 3, the displacement sensor 30 comprises six different parts that are to be assembled and, in some cases, fabricated. These parts include an outer housing 32, an internal spring 34, a slot pin 36, a retainer pin 38, a light source 40, and a light detector 42. The slot pin 36 is partially disposed within the outer housing 32 and is urged outward from the housing by the internal spring 34. The retainer pin 38 is fixed to the outer housing 32 and extends into a slot 44 of the slot pin 36 so as to limit the extent to which the slot pin can extend from the outer housing. During use, the slot pin 36 can be pushed into the outer housing 32 (shown in partial cut-away) against the force of the internal spring 34 by a component whose displacement is to be sensed. The magnitude of the displacement is determined using the light source 40, which emits light that passes through the slot 44 and is detected by the light detector 42. Because the slot 44 narrows from one end to the other, the amount of light detected by the light detector 42 dependents upon how far the slot pin 36 has been pushed into the outer housing 32. The intensity of the light can therefore be correlated with a displacement distance. To manufacture this product, one or more of the parts must be fabricated (one or more can comprise off-the-shelf items) and the parts then must be assembled in the manner shown in FIG. 3.

There are various challenges associated with manufacturing the displacement sensor 30. For example, the slot 44 needs to be formed with a particular degree of precision to ensure accurate displacement measurements. In addition, the light source 40, slot 44, and light detector 42 must be aligned with each other with a particular degree of precision. Accordingly, before manufacturing the displacement sensor 30, various manufacturing metrics must be evaluated and a suitable manufacturing system must be defined that can satisfy targets for these metrics. The manufacturing optimization program 24 can assist the user in this process. An example of use and operation of the program 24 will now be discussed in relation to FIGS. 4-16.

Figure 4:
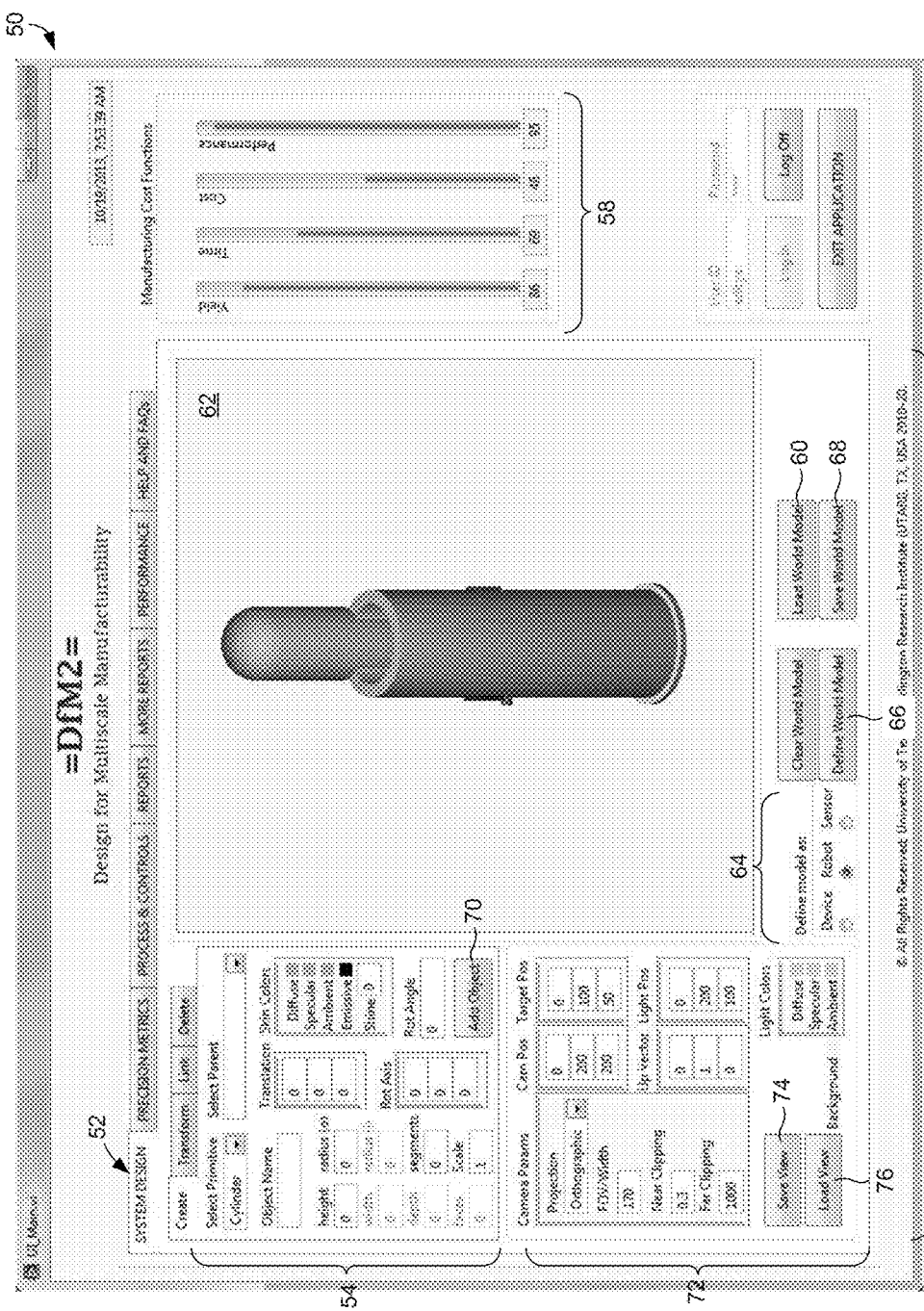
FIG. 4 is a screen shot of an embodiment of a user interface of the manufacturing optimization program showing a page associated with a "Create" sub-tab of a "System Design" tab of the interface.

FIG. 4 is a screen shot of an example user interface 50 of the manufacturing optimization program 24. The user interface 50 generally comprises multiple pages that can be accessed using various tabs that are presented to the user. Shown in FIG. 4 is a page associated with a "Create" sub-tab 54 of the "System Design" tab 52. This page, like many of the pages of the user interface 50, is divided into two parts: an input section 56 and an output section 58. The input section 56 occupies the left side of the page while the output section 58 occupies the right side of the page. Generally speaking, the input section 56 is used to receive various parameters input by the user regarding the product to be manufactured, the manufacturing system to be used to manufacture (e.g., assemble) the product, and any feedback sensors that are to be used to provide feedback to the manufacturing system during the manufacturing (e.g., assembly) process. In the convention of the user interface 50, the product is referred to as the "device," the manufacturing (assembly) system is referred to as the "robot," and the feedback sensor is referred to as the "sensor."

The output section 58 is used to identify manufacturing metrics, or "cost functions," that the manufacturing optimization program 24 calculates based upon the user inputs. In the illustrated example, these metrics include process yield ("Yield"), cycle time ("Time"), overall cost ("Cost"), and product performance ("Performance"). Each of these metrics are quantitatively represented as a number that ranges from 1 to 100 and a bar that provides a visual representation of the number. The process yield relates to the percentage of products manufactured that will be acceptable based upon the user's performance specifications. The cycle time relates to the time required to fabricate and assemble (i.e., manufacture) the product and is expressed as a percentage of a user-defined optimum time. The overall cost relates to all costs associated with manufacturing the product, including raw material costs, equipment costs, labor costs, and the like. The overall cost can be expressed as a percentage of a user-defined optimum cost. Finally, the product performance relates to one or more user-defined performance metrics. For example, the performance metrics could comprise the tolerances for various parts of the displacement sensor 30. The product performance can be expressed as a percentage of a user-defined optimum performance.

The user can begin the optimization process by specifying a model of the product that is to be manufactured. In some embodiments, the user can either import an existing model of the product or create a new model using modeling tools of the manufacturing optimization program 24. In the former case, the user can import the model from a suitable modeling program, such as SolidWorks®. To do this, the user can select the "Load World Model" button 60, which facilitates the importation. Above this button is a view window 62 that shows a graphical representation of the model, whether it is imported or created with the manufacturing optimization program 24.

Once a model has been imported, the user can define it as a device, robot, or sensor using the selectors 64 provided below the window 62. For example, in the case of a model of the product to be manufactured, the user would select "Device" to define the model as pertaining to the product. Once this selection has been made, the model definition can be registered by selecting the "Define World Model" 66. At this point, the model can be saved by selecting the "Save World Model" button 68.

In cases in which the user wishes to create the model using the manufacturing optimization program 24, the user can do so using the tools provided in the "Create" sub-tab 54. With these tools, the user can select the basic shapes (boxes, cylinders, spheres, etc.) that represent each part of the product, identify the name of the parts, identify the dimensions of the parts, identify the translation of the parts, identify colors for the parts, and so forth. In some embodiments, one or more of the parts can be selected from the database 26 associated with the manufacturing optimization program 24. For example, if the light source 40 and the light detector 42 are off-the-shelf items whose specifications are stored in the database 26, the user can select them from the database and integrate them into the model. In such a case, all of the manufacturer's specifications for the part will be incorporated into the model as well. On the other hand, if the parts are custom parts and are not contained in the database 26, the user can add the parts and their specifications to the database so that they will be available for selection from the data base. Irrespective of how the parts are specified, they can be added to the model by selecting the "Add Object" button 70.

Also provided on the page shown in FIG. 4 is a camera control section 72 that can be used to control the view of the model that is shown in the window 62. For example, the user can change the perspective of a virtual camera that views the model, the positions of virtual lights that shine on the model, and so forth. The user has the option to either load a stored view using the "Load View" button 74 or save a created view using the "Save View" button 76.

Figure 5:
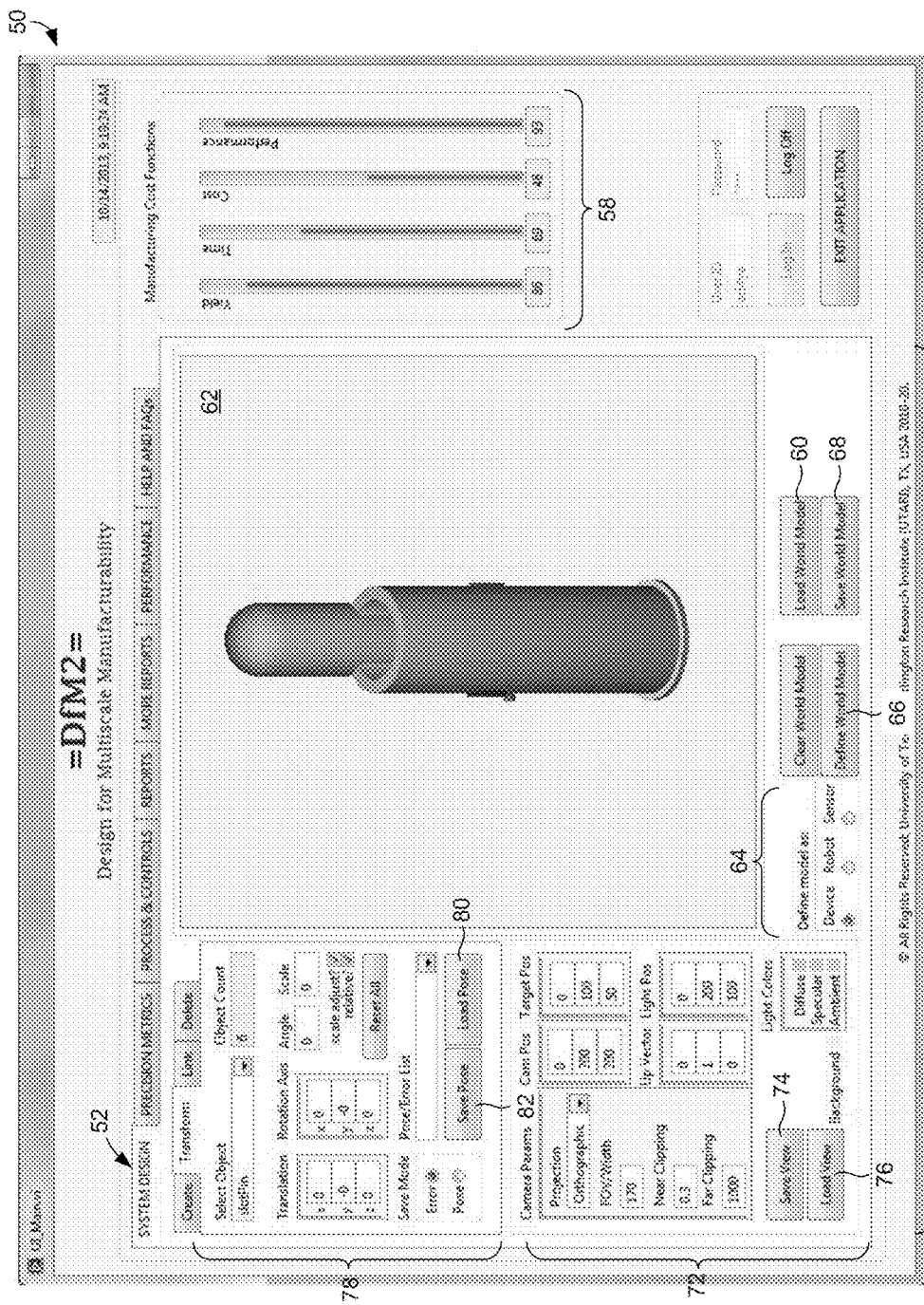
FIG. 5 is a screen shot of a page associated with a "Transform" sub-tab of the "System Design" tab of the user interface.

FIG. 5 shows a page that is associated with a "Transform" sub-tab 78 of the "System Design" tab 52. This sub-tab can be used to precisely position the various parts or components of a model. For example, in the context of the product, the "Transform" sub-tab 78 can be used to specify that the slot pin 36 of the displacement sensor 30 is parallel to the outer housing 34. These parameters can be specified in terms of translation, rotation, angle, and scale for each part of the model. Notably, if a particular relationship, or pose, has already been created, it can be opened using the "Load Pose" button 80. Otherwise, the relationship or pose can be stored using the "Save Pose" button 82.

Figure 6:
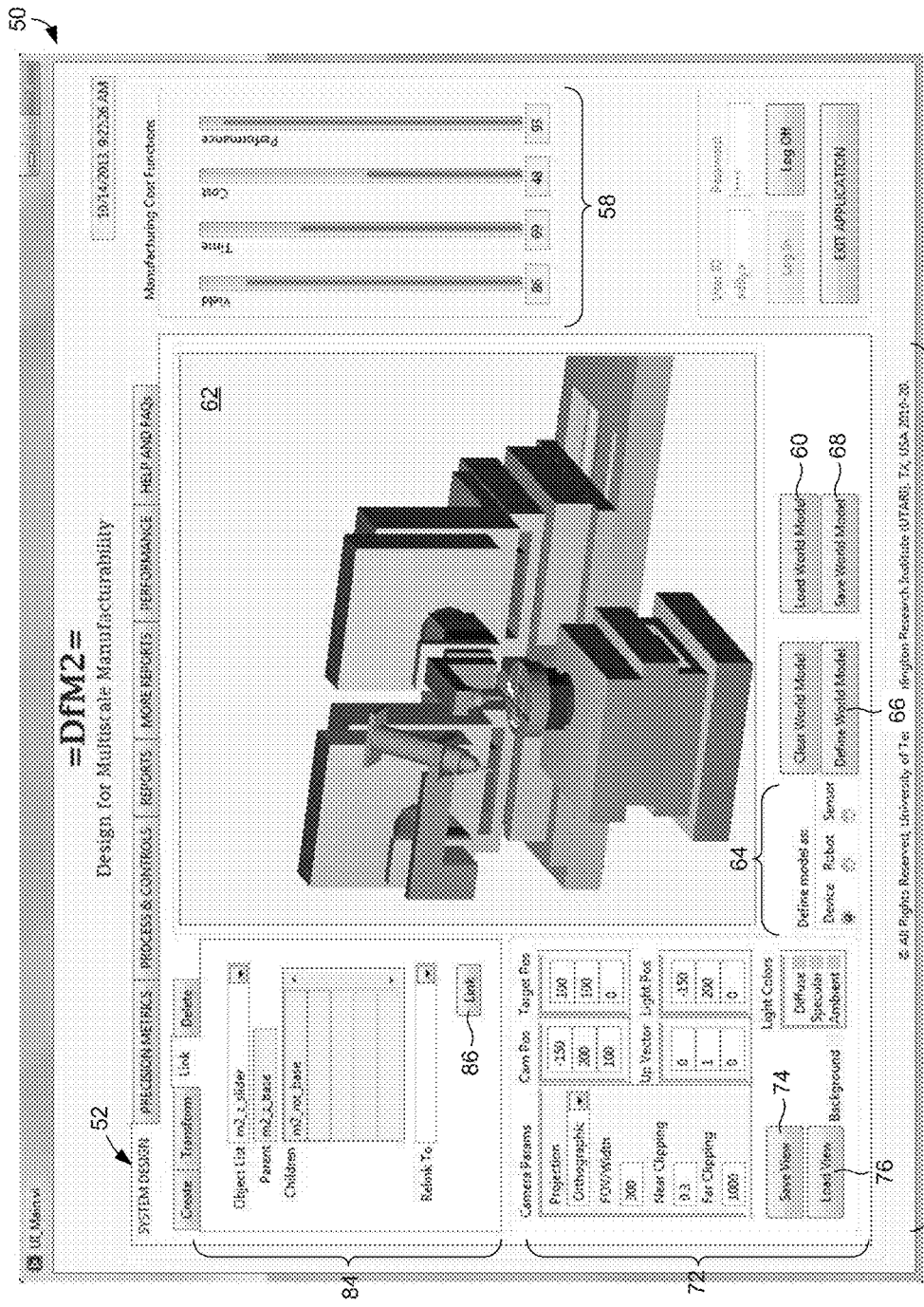
FIG. 6 is a screen shot of a page associated with a "Link" sub-tab of the "System Design" tab of the user interface.

Once a product model has been created or imported, a model for the manufacturing system, and for the feedback sensor if applicable, can be created or imported in similar manner to that described above for the product. FIG. 6 shows a model of an example manufacturing (assembly) system in the window 62 that can have been created or imported using the manufacturing optimization program 24. This manufacturing system comprises multiple robots that include one or more manipulation modules that are used to provide linear or rotational motion. In addition, two of the robots include an end effector that is configured to perform a discrete manufacturing (assembly) process. Examples of such robots are described in U.S. patent application Ser. No. 14/061,063, which was mentioned above.

FIG. 6 shows a page that is associated with a "Link" sub-tab 84 of the "System Design" tab 52. This sub-tab can be used to define how the parts or components of a model are connected together. In the example shown in FIG. 6, the "Link" sub-tab 84 is being used to define the connections between the components of the manufacturing system model shown in the window 62. In particular, a component "m2_x_base" is identified as a parent component of and a component "m2_rot_base" is identified as a child component of a component "m2_x_slider." With such links being defined, the interaction of the components and the overall capability of the manufacturing system can be specified. Once the links between components have been defined, they can be stored by selecting the "Link" button 86.

Figure 7:
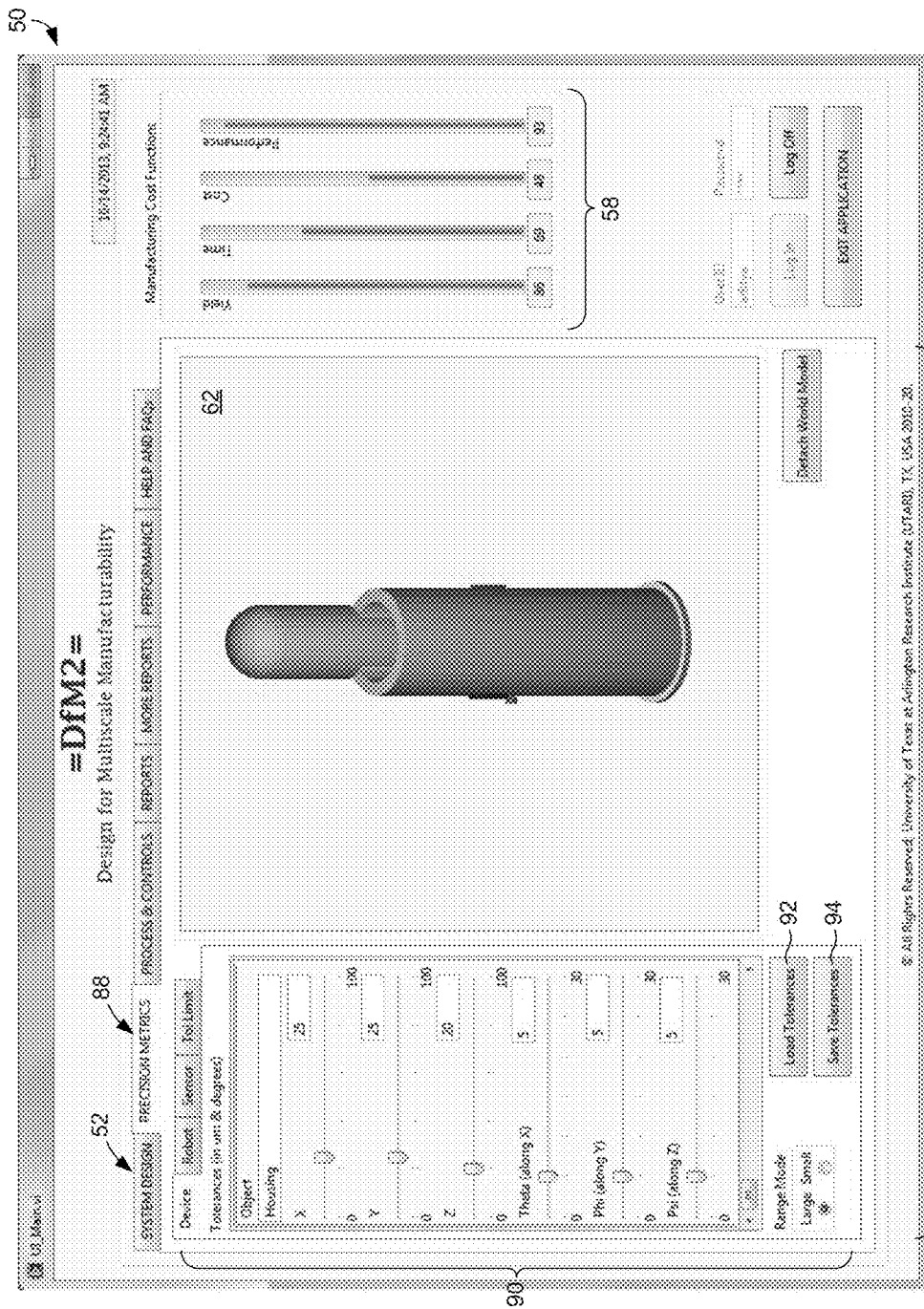
FIG. 7 is a screen shot of a page associated with a "Device" sub-tab of a "Precision Metrics" tab of the user interface.

After the product, manufacturing system, and feedback sensor (if applicable) have been specified using the "System Design" tab 52, the user can then select the "Precision Metrics" tab 88 (FIG. 7) of the user interface 50 to specify various parameters for each of the parts or components of the product, manufacturing system, and feedback sensor. FIG. 7 shows a "Device" sub-tab 90 that can be used to specify the parameters of the product. For the product, precision relates to the tolerance of the various parts of the product. With the "Device" sub-tab 90, the user can specify, as to each part of the product, the tolerances for the part in six degrees of freedom (x, y, z, θ, φ, and ψ). Notably, each of these parts are automatically loaded into the "Device" sub-tab 90 for selection once the product model has been created or imported. In the illustrated embodiment, the tolerances are expressed in microns and degrees and can be adjusted by the user with sliders. As an alternative to manually identifying the tolerances, the user can instead load tolerances stored in the database 26 using the "Load Tolerances" button 92. Once the tolerances have been specified, they can be stored using the "Save Tolerances" button 94.

Figure 8:
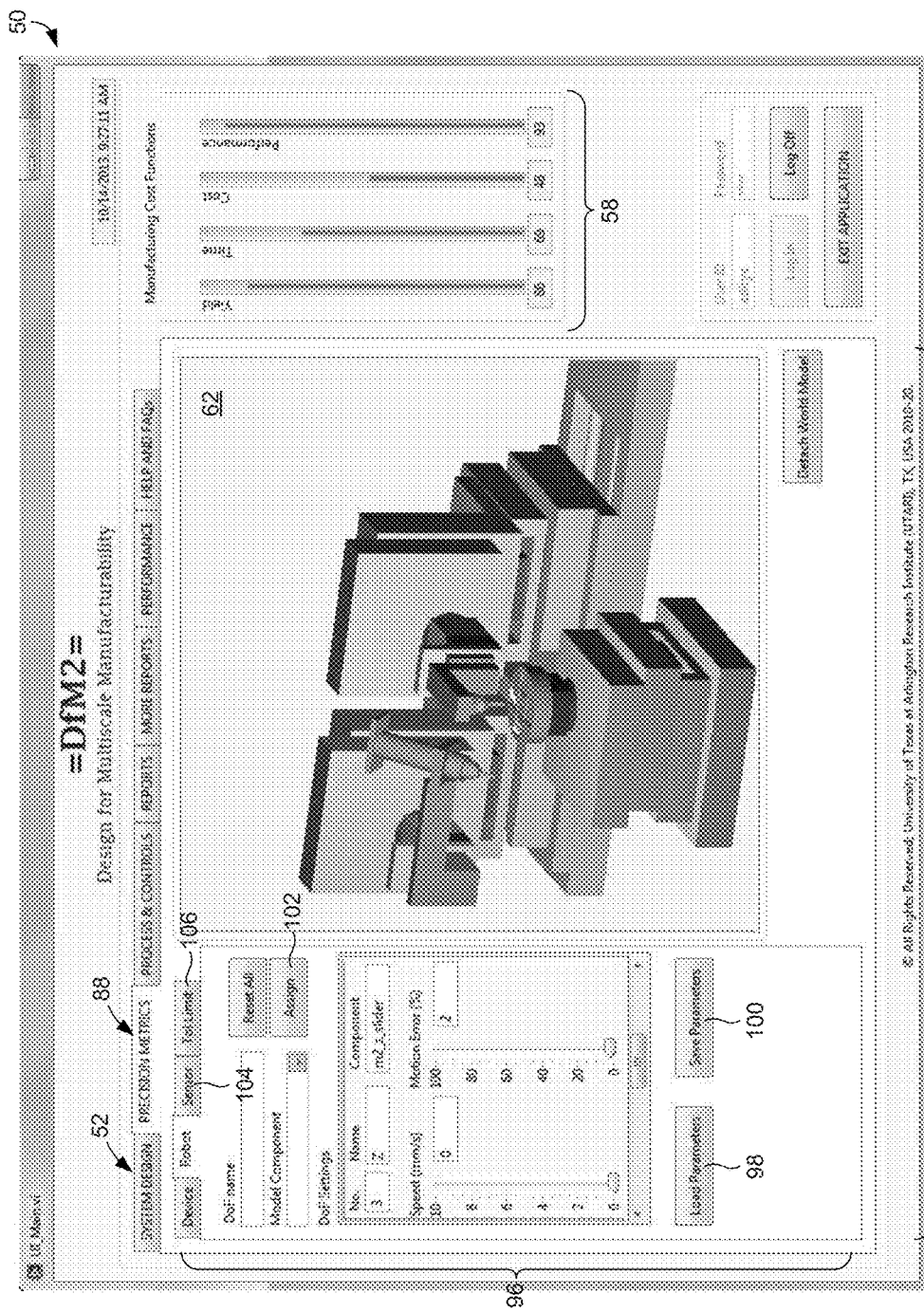
FIG. 8 is a screen shot of a page associated with a "Robot" sub-tab of the "Precision Metrics" tab of the user interface.

The various parameters for the components of the manufacturing (assembly) system can be specified using the "Robot" sub-tab 96 shown in FIG. 8. For the manufacturing system, the precision relates to precision with which the system operates. With the "Robot" sub-tab 96, the user can specify, as to each component of the manufacturing system, a reference axis for the component, a speed with which the component moves, and an error of that motion. The speed corresponds to the cycle time metric and the motion error corresponds to the process yield metric. In the illustrated example, the speed and error are expressed in millimeters per second and percent, respectively, and can also be adjusted using sliders. If the parameters have already been stored for a given component, they can be loaded using the "Load Parameters" button 98. Alternatively, if the parameters have been input or changed by the user, they can be stored using the "Save Parameters" button 100. In addition, the user can assign a degree of freedom (DOF) name to each component of the manufacturing system model using the "Assign" button 102. In the illustrated embodiment, there are three different robots in the manufacturing system, in which case performance parameters would be specified for each component of each robot.

Notably, as the parameters for the product and the manufacturing system are selected by the user, the manufacturing metrics identified in the output section 58 of the page are updated in real time so that the user can see the effect the selected parameters have on those metrics and, if necessary, adjust the selections in order to obtain the desired values for one or more of the metrics.

Parameters can also be specified for the feedback sensor (if applicable) using the "Sensor" sub-tab 104. In addition, a maximum acceptable tolerance can be specified for each part of the product using the "Tol Limit" button 106.

Figure 9:
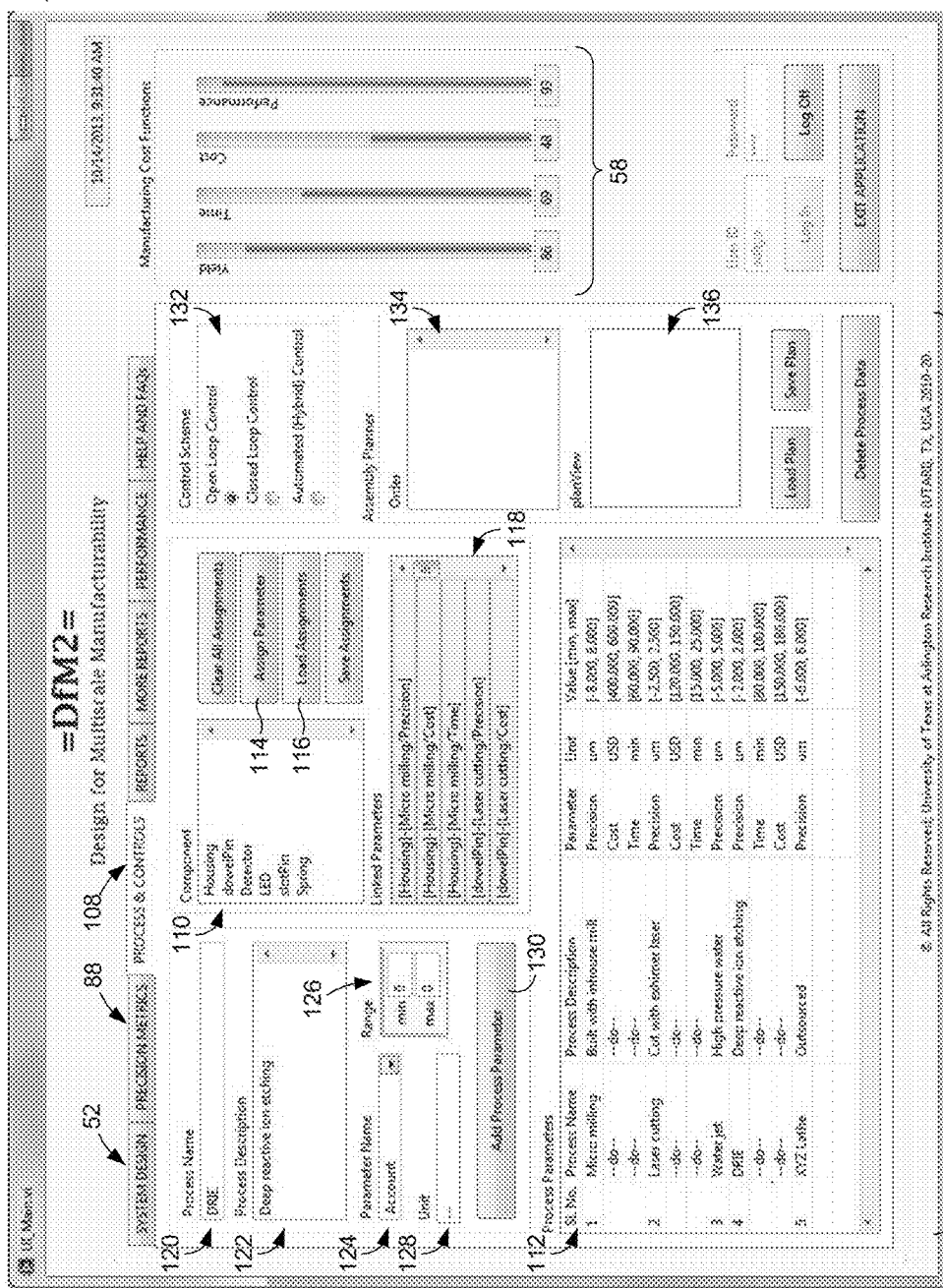
FIG. 9 is a screen shot of a page associated with a "Process & Controls" tab of the user interface.

After all of the parameters for the product, manufacturing system, and feedback sensor (if applied) have been specified using the "Precision Metrics" tab 88, specific processes can be selected for the fabrication of the various parts of the product using the "Process & Controls" tab 108, as shown in FIG. 9. The page associated with this tab lists each of the parts of the product in a "Component" listing 110. In addition, the page also lists each fabrication process that is stored in the database 26 in a "Process Parameters" listing 112. In addition to identifying the processes by name, the "Process Parameters" listing 112 also identifies various parameters associated with each process, such as precision, cost, and time. These parameters can assist the user in selecting the process that is most appropriate for the desired outcome.

The user can assign a particular fabrication process to a particular part by selecting a part in the "Component" listing 110, selecting a process in the "Process Parameters" listing 112, and then selecting the "Assign Parameter" button 114. If assignments have already been made previously, the assignments can be loaded using the "Load Assignments" button 116. Regardless, once assignments are made or loaded, they are identified in a "Linked Parameters" listing 118, which correlates each part with a process that has been selected to fabricate it.

The user also has the option to add fabrication processes that are not already stored in the database 26. The user can do this by specifying a process in the "Process Name" box 120, providing a description of the process in the "Process Description" box 122, and by specifying parameters (e.g., precision, cost, and time) for the process and the values and units for each parameter using the "Parameter Name" menu 124, the "Range" box 126, and the "Unit" box 128. As each parameter is entered it can be stored using the "Add Process Parameter" button 130.

In addition to selecting fabrication processes for the various product parts, the page associated with the "Process & Controls" tab 108 can also be used to select a control scheme for the manufacturing (assembly) process. In particular, open loop control, closed loop control, or automated (hybrid) control (in which the manufacturing optimization program 24 automatically determines what control scheme to use) can be selected using the "Control Scheme" box 132. Furthermore, the user can select the order of actions to be performed by the manufacturing system using the "Order" box 134. In some embodiments, the user can specify the sequence of each discrete movement made by the manufacturing system in assembling the product. The "planView" box 136 can be used display a report on assembly of the product based upon a three-dimensional simulation of the assembly process as specified by the user in the "Order" box 134.

Figure 10:
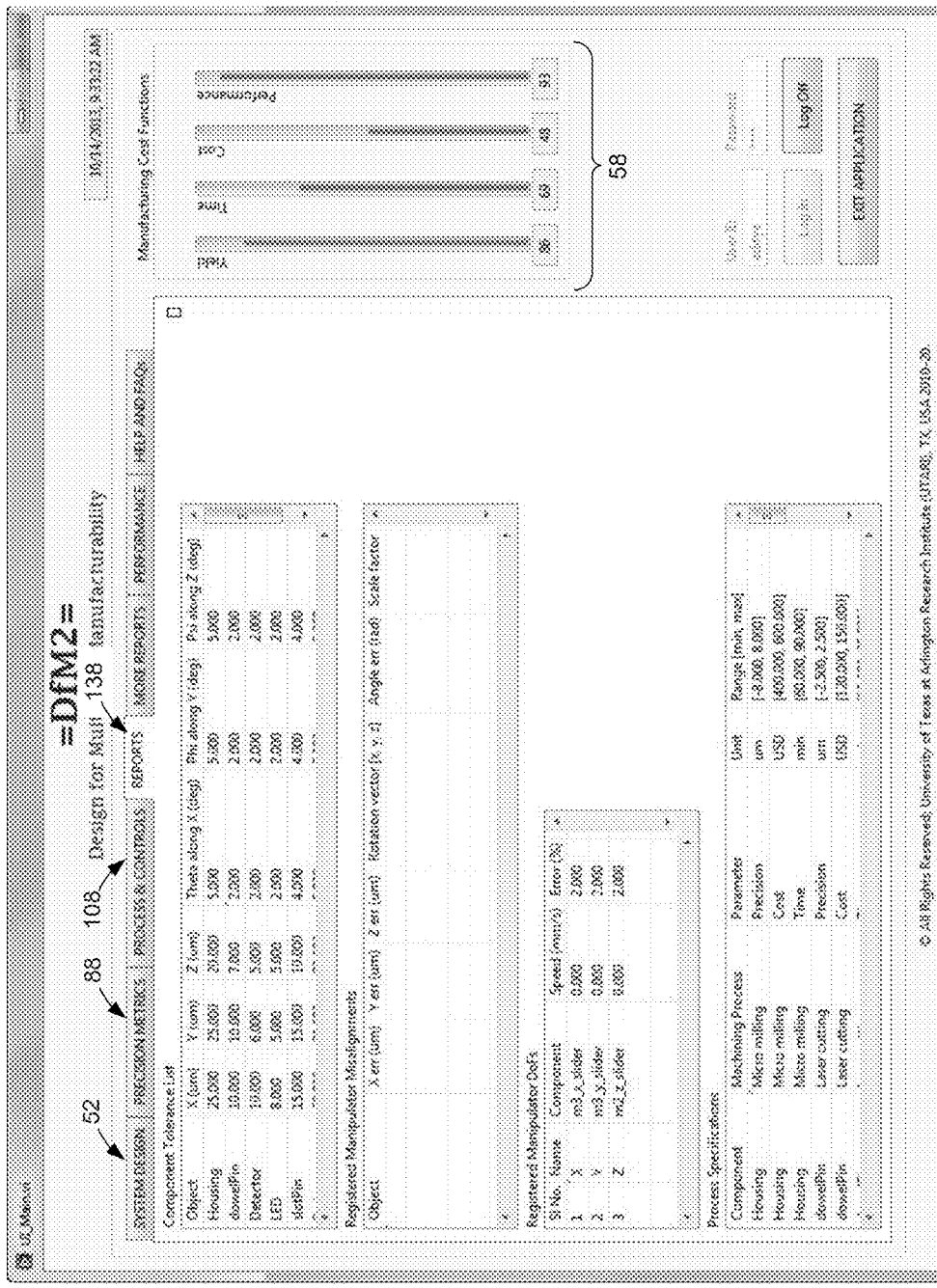
FIG. 10 is a screen shot of a page associated with a "Reports" tab of the user interface.
Figure 11:
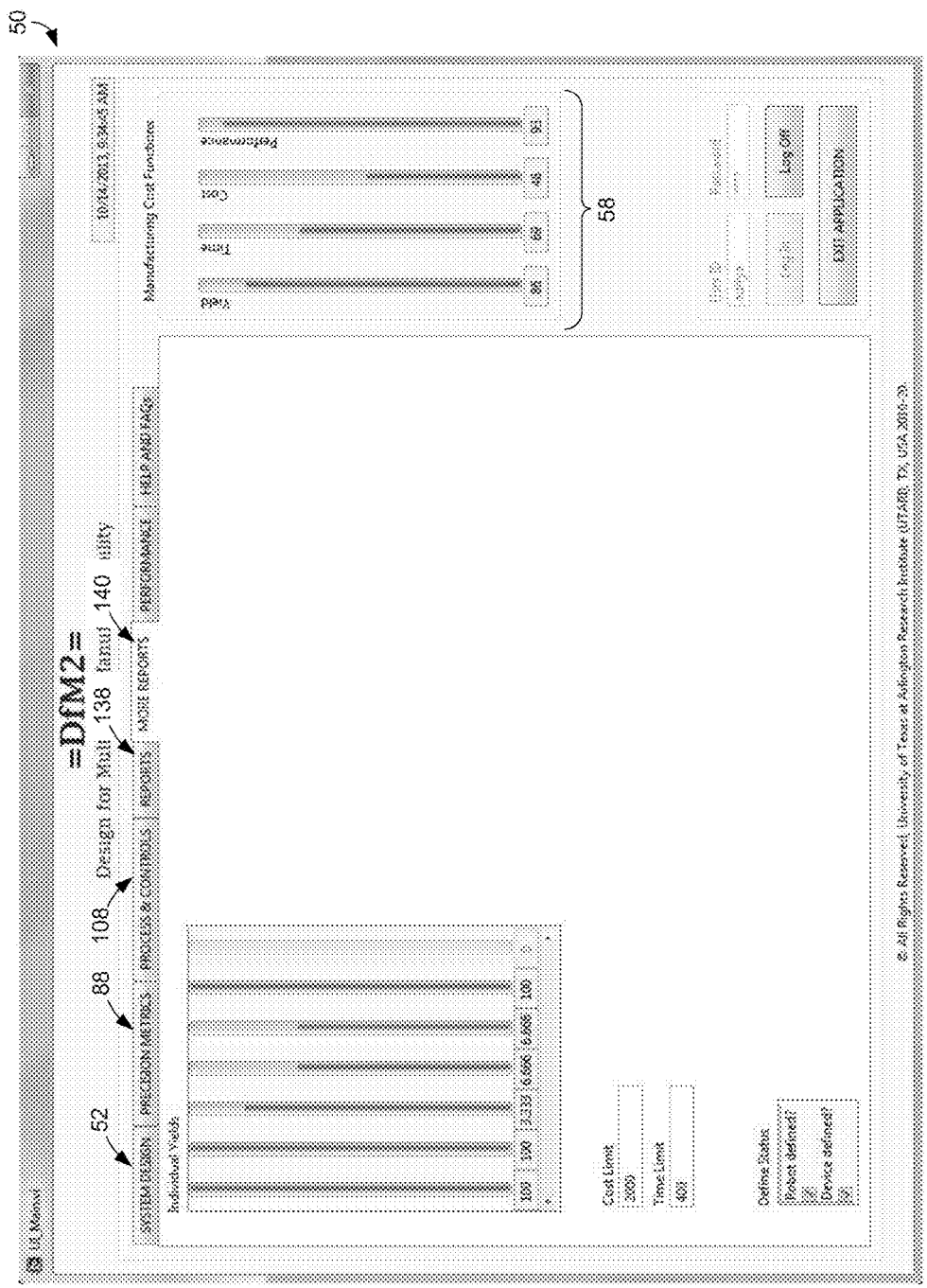
FIG. 11 is a screen shot of a page associated with a "More Reports" tab of the user interface.

Referring next to FIG. 10, shown is a page associated with the "Reports" tab 138. Listed on this page are all of the selections the user has made regarding the product, manufacturing system, feedback sensor, and fabrication processes. Accordingly, the user can review all of his or her selections made using the manufacturing optimization program 24 on a single page presented in the user interface 50. Further information about the product parts can be viewed on a page associated with the "More Reports" tab 140, shown in FIG. 11. On this page, the process yield for each part of the product can be represented with a numerical value and a bar that provides a visual representation of the value. These yields provide more specific information than the overall yield metric for the product as a whole, which is identified in the output section 58.

Figure 12:
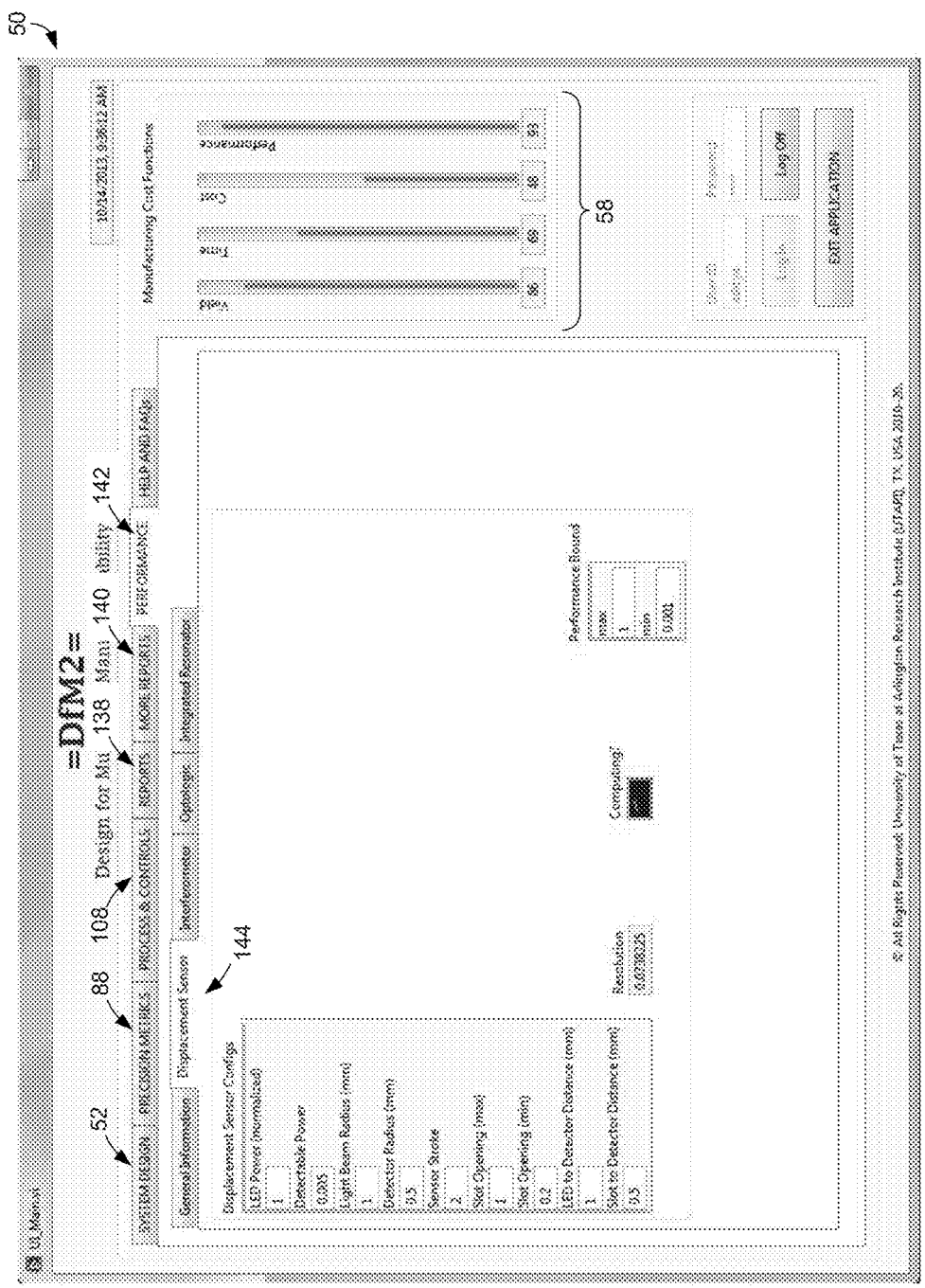
FIG. 12 is a screen shot of a page associated with a "Displacement Sensor" sub-tab of a "Performance" tab of the user interface.

With reference next to FIG. 12, the user can select the "Performance" tab 142 to define the parameters upon which the performance metrics will be based. In the example of FIG. 12, the "Displacement Sensor" tab 144 has been selected and the multiple parameters have been specified for the displacement sensor that will be used by the manufacturing optimization program 24 to determine the performance metric. As shown in the figure, these parameters include the light source (LED) power, the detector radius, the slot dimensions, etc.

Figure 13:
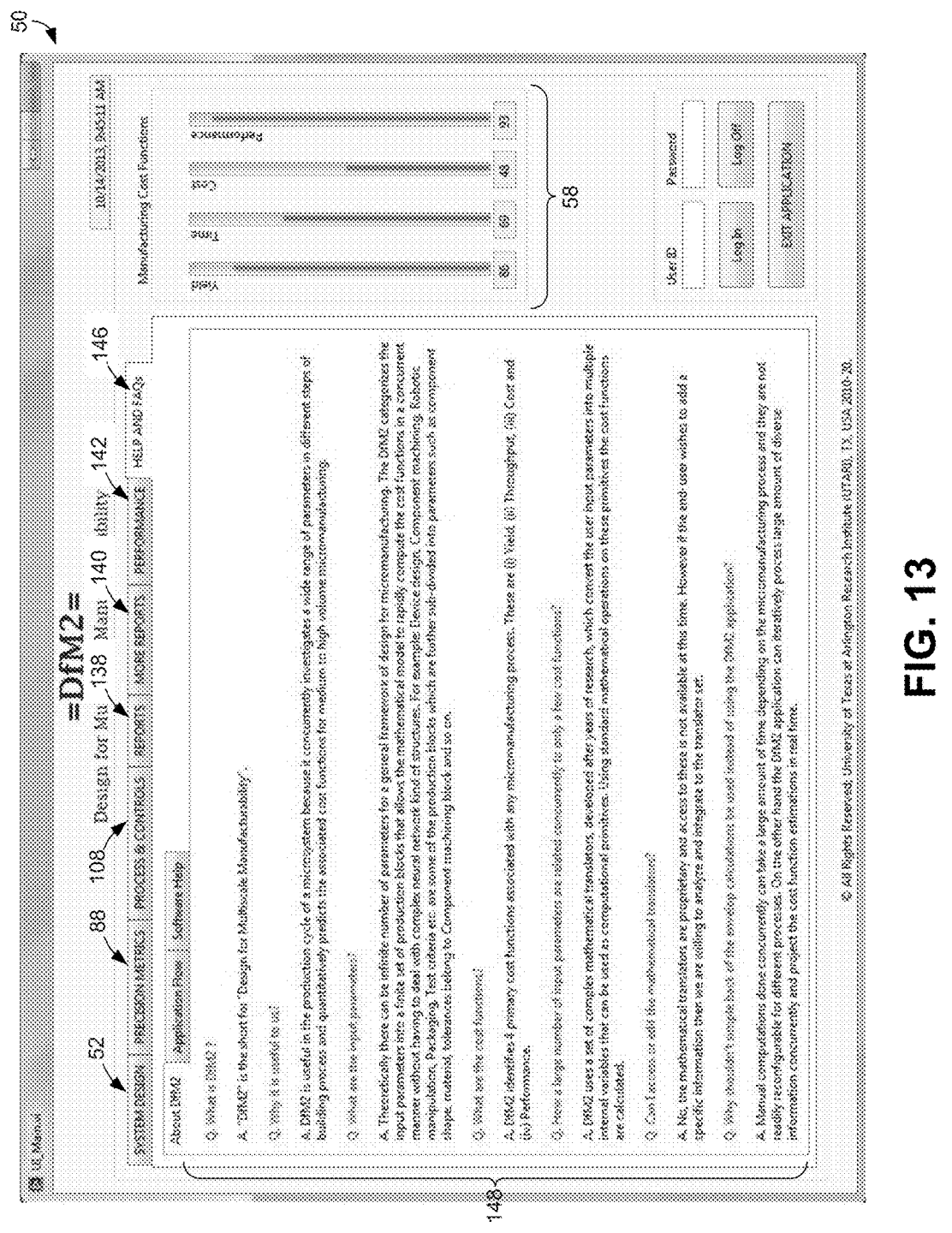
Figure 14:
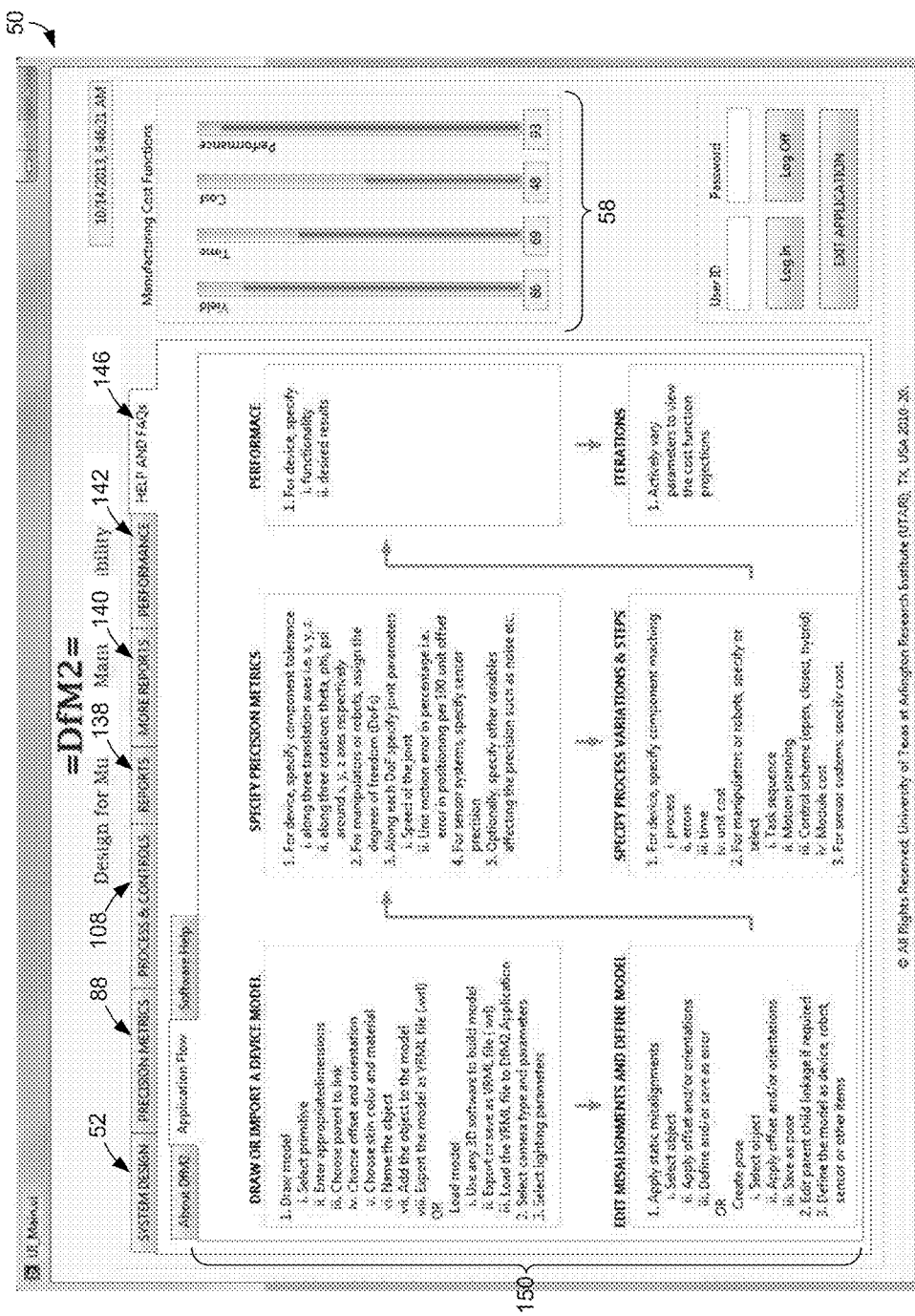
FIG. 14 is a screen shot of a page associated with an "Application Flow" sub-tab of the "Help and FAQs" tab of the user interface.
Figure 15:
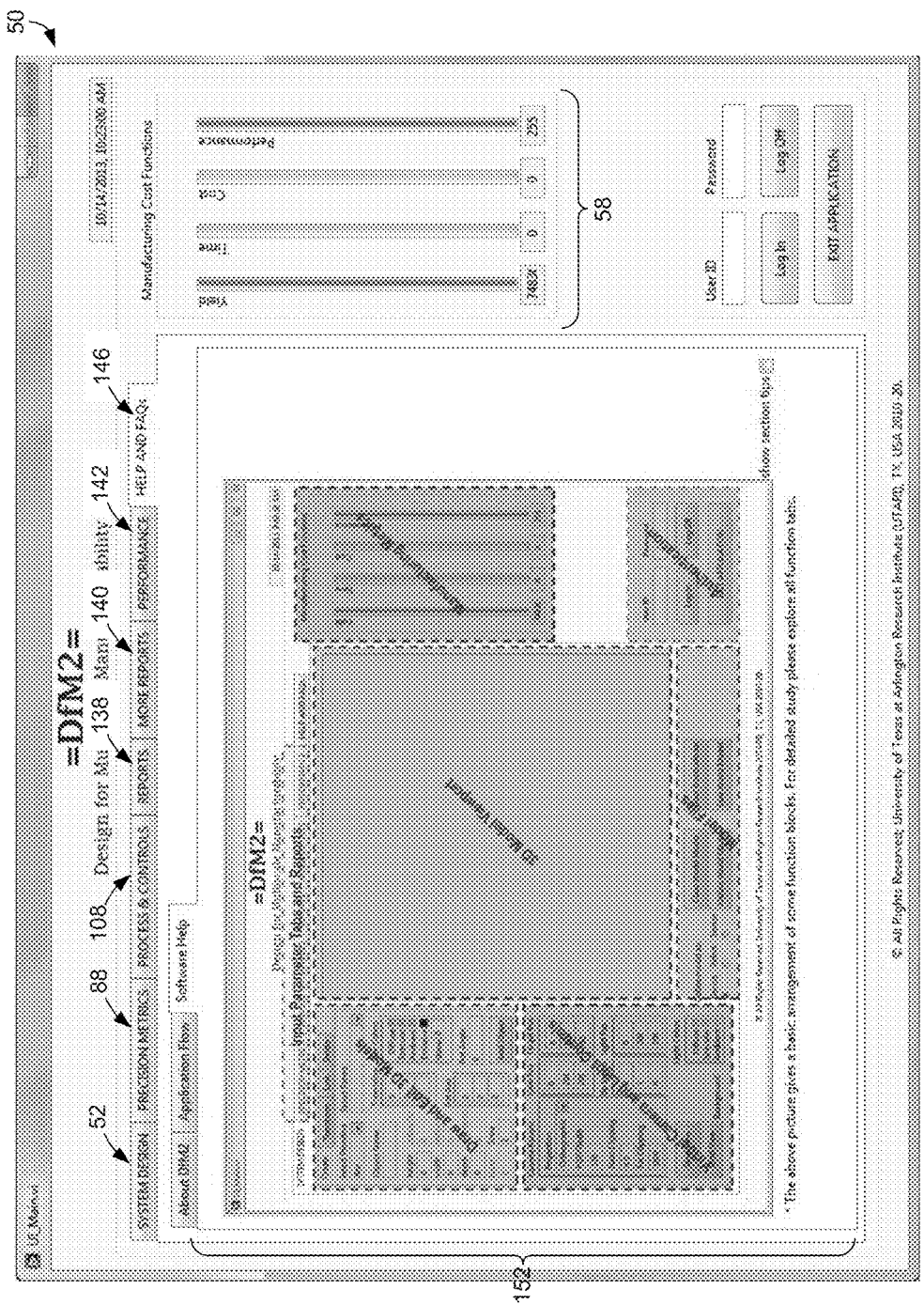
FIG. 15 is a screen shot of a page associated with a "Software Help" sub-tab of the "Help and FAQs" tab of the user interface.

In addition to the aforementioned tabs, the user interface 50 can include a "Help and FAQs" tab 146 shown in FIGS. 13-15. Beginning with FIG. 13, shown is a page associated with an "About DfM2" tab 148 that provides general information about how the manufacturing optimization program 24 and user interface 50 work. Turning to FIG. 14, a page associated with an "Application Flow" tab 150 provides assistance in relation to the flow of the optimization process using the manufacturing optimization program 24 and user interface 50. Finally, as shown in FIG. 15, a page associated with a "Software Help" tab 152 provides assistance in relation to particular aspects of the user interface 50 and provides instruction as to each (when selected).

Figure 16:
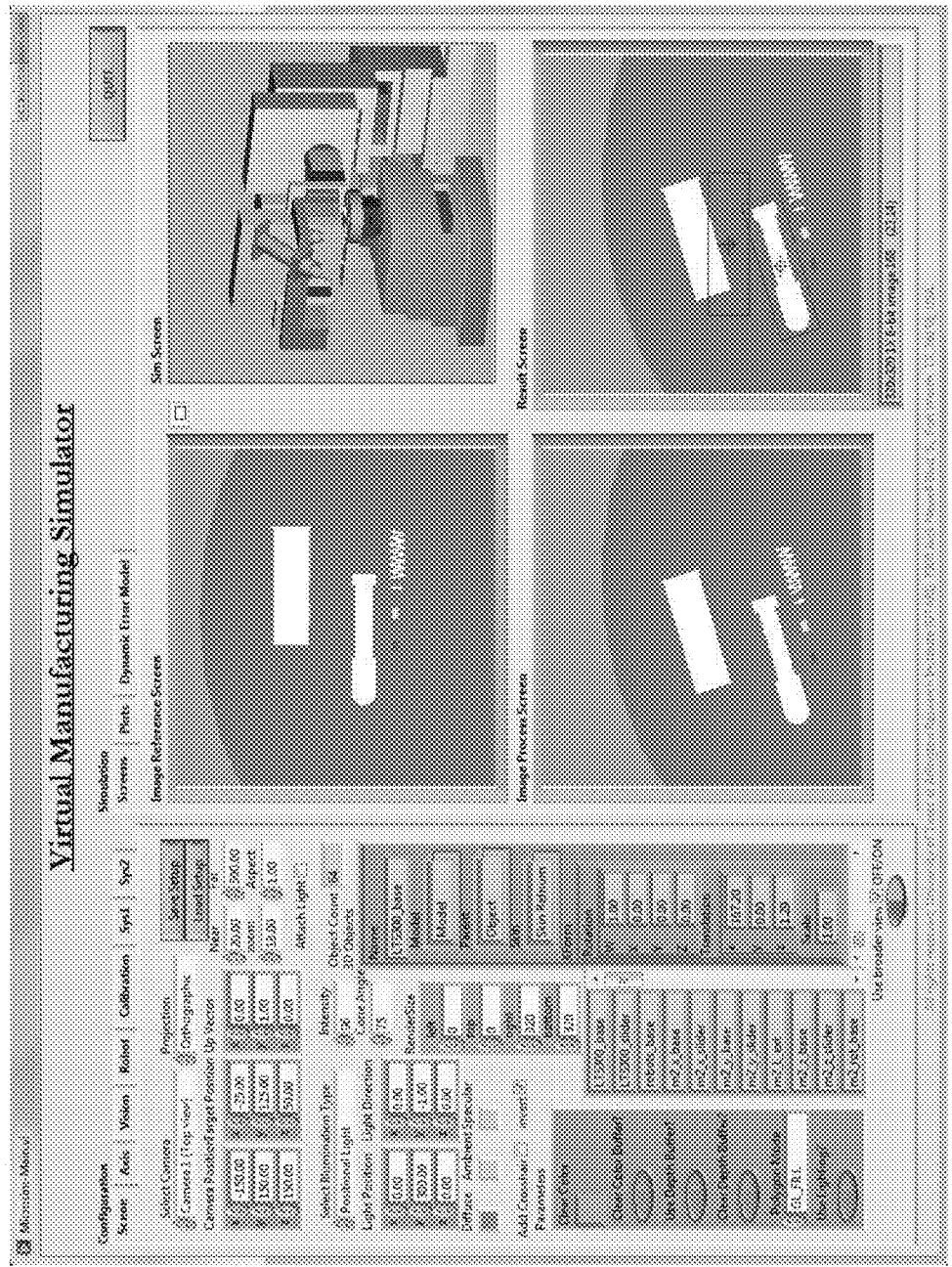
FIG. 16 is a screen shot of a page associated with a virtual manufacturing simulator.

As mentioned above, the manufacturing optimization program 24 can also include a virtual reality simulator module that provides a realistic simulation of automated assembly of the product. FIG. 16 illustrates a user interface 154 for the simulator. As shown in that figure, the user interface 154 can be used to show the various parts of the product prior to assembly as well as a video simulation of the actions performed by the manufacturing system in assembling the parts. In some embodiments, the virtual reality simulator module creates a simulation environment, referred to herein as "Microsim," that can estimate, with high probability, the success rate of a typical assembly operation for a specific design of a product and a specific configuration of robotic assembler, and can provide planning and control schemes for automation. Unlike standard numerical simulation tools, the module takes the assembly into virtual reality where random events, such as lighting conditions, vibration noise, and so forth impact the assembly in a similar fashion as they would during actual assembly.

The virtual components in the simulator such, as the product parts, robotic assemblers, and feedback sensors, can be modeled in a virtual reality markup language (VRML) format for easy portability among standard three-dimensional modeling software and the Microsim application. The Microsim application can extract information regarding the robot kinematic chain, including the name of the links, hierarchy of the joints, constraints, sensor specifications, etc., from the three-dimensional model. System calibration and process automation can be carried out with the aid of machine vision executed on the virtual parts. In addition, random ambient conditions, such as lighting, vibration, etc., can be modeled in real time within user-specified limits.

Figure 17:
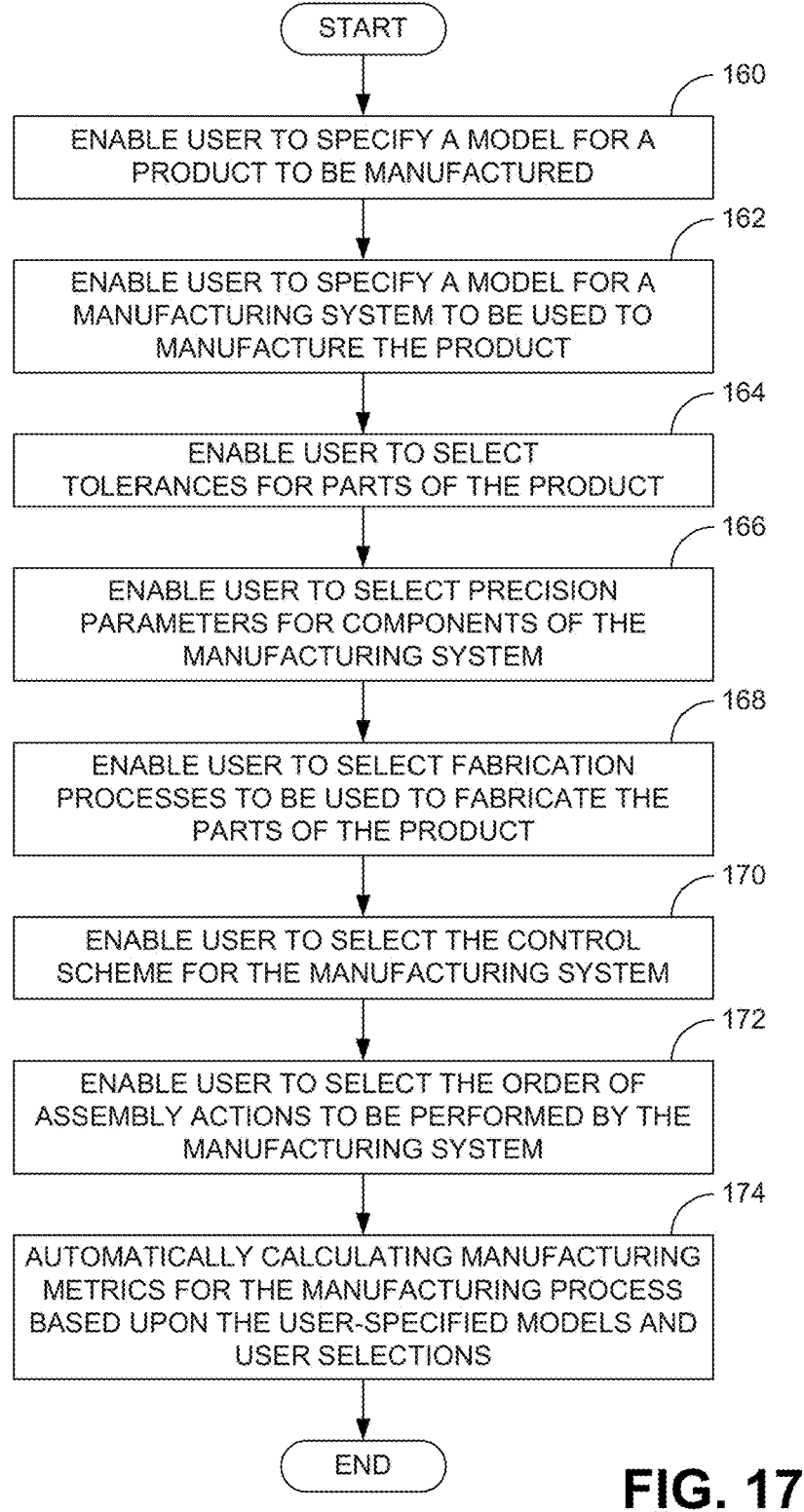
FIG. 17 is a flow chart of an embodiment of a method for optimizing manufacturing.

FIG. 17 is a flow chart of an example of operation of the manufacturing optimization program 24 that summarizes the process flow described above. Beginning with block 160, the program 24 enables a user to specify a model for a product that is to be manufactured. As described above, the user can either import an existing model or create a new model using tools of the manufacturing optimization program 24. In either case, the user can incorporate parts that are stored in the database 26 associated with the program 24, in which case any stored specifications for those parts can be automatically incorporated into the model as well. In addition to identifying the parts of the product, the manufacturing optimization program 24 enables the user to identify the orientations of the parts (using the "Transform" sub-tab 78) and their relationship with each other (using the "Link" sub-tab 84).

The manufacturing optimization program 24 can further enable the user to specify a model for the manufacturing system to be used to manufacture the product, as indicated in block 162. By way of example, the manufacturing system can be used to assemble the various parts of the product, in which case the manufacturing system can be referred to as an assembly system. Again, the user can either import an existing model or create a new model using tools of the manufacturing optimization program 24, and the user can incorporate components that are stored in the database 26, in which case any stored specifications for those components can be automatically incorporated into the model. In addition to identifying the components of the manufacturing system, the manufacturing optimization program 24 enables the user to identify the orientations of the components (using the "Transform" sub-tab 78) and their relationship with each other (using the "Link" sub-tab 84).

In addition to specifying models for the product and the manufacturing system, the manufacturing optimization program 24 can be used to specify a model for one or more feedback sensors that are to be used during the manufacturing process. Again, the user can either import an existing model or create one using tools of the manufacturing optimization program 24.

Once models for at least the product and the manufacturing system have been specified, the manufacturing optimization program 24 can enable the user to select various precision parameters for at least the product and the manufacturing system. As discussed above, these parameters affect the manufacturing metrics calculated by the manufacturing optimization program 24, which can include process yield, cycle time, overall cost, and product performance. Regarding the product, the precision parameters relate to the tolerances of the various parts of the product. Therefore, as indicated in block 164, the user can be enabled to select tolerances for each of the parts of the product. As described above, these tolerances can, for example, be selected for six degrees of freedom for each part. Regarding the manufacturing system, the precision parameters relate to the speed and precision with which the manufacturing system operates. Therefore, as indicated in block 166, the manufacturing optimization program 24 can also enable the user to select precision parameters for components of the manufacturing system, which can include the reference axis, speed, and motion error for each component of the manufacturing system.

In addition to selecting precision parameters for the product and the manufacturing system, the manufacturing optimization program 24 can also be used to select precision parameters for one or more feedback sensors that are to be used during the manufacturing process.

Referring next to block 168, the manufacturing optimization program 24 can enable the user to select fabrication processes that are to be used to fabricate the parts of the product. As described above, the user can, in some embodiments, select a part and link a particular fabrication process to the part to indicate that the part is to be fabricated using that process. The user is free to either select a fabrication process that is stored in the database 26, for which various parameters (e.g., precision, cost, time) are known, or define his or her own fabrication process and explicitly identify the associated parameters. As with the tolerance, speed, and motion error parameters described above, selected fabrication process has a direct effect on the manufacturing metrics.

The manufacturing optimization program 24 can further enable the user to select the control scheme that is to be used for the manufacturing (assembly) process, as indicated in block 170. As expressed above, the user can select from open loop, closed loop, or automatic control. As indicated in block 172, the manufacturing optimization program 24 can further enable the user to select the order of the assembly actions that are to be performed by the manufacturing system.

Once the above information has been input by the user, the manufacturing optimization program 24 automatically calculates the manufacturing metrics for the manufacturing process based upon the user-specified models and user selections, as indicated in block 174. As described above, each of process yield, cycle time, overall cost, and product performance metrics can be calculated and presented to the user so that the user can determine whether or not the manufacturing process, as based upon his or her inputs, is acceptable or not. If not, the user can change one or more of the inputs and observe how it affects the manufacturing metrics. When changes are made by the user, the manufacturing metrics will change in real time. In this manner, the user can immediately see the effect of changing the manufacturing parameters. By using an iterative process, the user can then optimize the manufacturing process so that it will have the desired manufacturing metrics prior to building the manufacturing system or producing a single product.

Experiments were performed to analyze the effectiveness of the manufacturing optimization program 24 (i.e., DfM$^2$ program). A heterogeneous microsystem in the form of a microspectrometer was selected as a product case study for this analysis. Two distinct microsystem designs were developed. The design tolerances for microsystem designs are given in Table 1.

TABLE 1

| Design Tolerances | | |
|---|---|---|
| Tolerance | Design 1 | Design 2 |
| Part to die | 10 μm (along x, y) | 50 μm (along x, y) |
| | 5° (along θ, φ) | 2° (along θ, φ) |
| | 2° (along ψ) | 1° (along ψ) |
| Lens to part | 20 μm (along x, y) | 10 μm (along x, y) |
| Prism to die | 5 μm (along x, y) | 10 μm (along x, y) |
| | 30 μm (along z) | 50 μm (along z) |
| | 2° (along θ, φ, ψ) | 0.5° (along θ, φ, ψ) |

In addition, two different configurations were developed for a robotic manipulator to be used to assemble and package the microsystem. The precision specifications for the robotic manipulator configurations are given in Table 2.

TABLE 2

| Manipulator Precisions | | |
|---|---|---|
| Precision | Configuration 1 | Configuration 2 |
| x | 1.34 μm | 2.28 μm |
| y | 1.12 μm | 1.61 μm |

TABLE 2-continued

| Manipulator Precisions | | |
|---|---|---|
| Precision | Configuration 1 | Configuration 2 |
| z | 0.87 μm | 1.15 μm |
| θ | 0.092° | NA |
| φ | NA | 0.01° |
| ψ | 0.005° | 0.006° |

The first manipulator configuration had an optimum speed of 1.2 mm/sec, whereas the second manipulator configuration had an optimum speed of 15 mm/sec. The materials and machining processes for the microsystem's parts are given in Table 3.

TABLE 3

| Microsystem Part Material and Machining Processes | | |
|---|---|---|
| Part | Design 1 | Design 2 |
| Base | Deep reactive ion etching (DRIE) on silicon on insulator (SOI) wafer (2 μm resolution) | Aluminum machined via CNC milling (25 μm resolution) |
| Fixtures | Deep reactive ion etching (DRIE) on silicon on insulator (SOI) wafer (2 μm resolution) | Nickel machined on Electro-discharge machine (EDM) (5 μm resolution) |
| Lens | Glass-Off the shelf (20 μm resolution) | Glass-Off the shelf (20 μm resolution) |
| Prism | Glass-Off the shelf (30 μm resolution) | Glass-Off the shelf (30 μm resolution) |

Based on the mechanical assembly and the optical alignment precision required for each part of the microsystem, multiple assembly sequences and manipulator motion paths with different control schemes were tested for over 1,000 iterations using the DfM$^2$ program. The results of the testing aided in the selection of an appropriate manipulator configuration and an optimized microassembly process to provide the necessary manufacturing metrics, including the expected device performance. The corresponding results from DfM$^2$ analysis for the micromanufacturing process are shown in Table 4.

TABLE 4

| DfM$^2$ Analysis Summary for the Microsystem | | | | | | |
|---|---|---|---|---|---|---|
| No. | Design (refer FIG.) | Robot (refer FIG.) | Yield (net) | Cost per unit | Time per unit | +Quality (% of optimum) |
| 1 | 1 | 1 | 90% | $120 | 25 min | 98% |
| 2 | 1 | 2 | 82% | $110 | 10 min | 90% |
| 3 | 2 | 1 | 88% | $ 75 | 22 min | 94% |
| 4 | 2 | 2 | 76% | $ 60 | 5 min | 91% |

+The microspectrometer is targeted to perform the 5 nm resolution in visible wavelength range.

One of the major challenges in flexible manufacturing applications, where system components are frequently reorganized to accommodate changes in tasks, is to guarantee necessary and sufficient precision metrics, such as resolution, repeatability, and accuracy. The inventors previously investigated the effect of parametric uncertainties in a serial overall positioning uncertainty at the end-effector. The virtual reality simulator module of the DfM$^2$ program implements the uncertainty propagation estimation algorithms and builds a statistical model for assembly feasibility study.

As evident from the results of Table 4, the DfM² program not only assisted in deciding upon the design of a complex microsystem but also simplified the use of reconfigurable microassembly platforms. With the DfM² program, a manufacturer can answer standard questions, such as how much a device would cost for a certain production volume and quality or which parameters can be manipulated to modify the cost and quality for a certain production volume, or what is an optimum configuration for the assembler to achieve the above, and so forth. Parameters, such as part design and tolerances, materials and part-machining cost, time and error, working alignment of parts, assembler cost, setup time, part fixturing cost, time and error, assembler precision (based on control system), process planning, feedback and test sensor precision, ambient conditions (virtually simulated), etc., are each taken into account while estimating the manufacturability metrics.

From the results shown in Table 4, it can be concluded, with significant reliability, that while the combination of the first microsystem design and the first manipulator design is suitable for low production volume with extremely accurate performance at a higher cost, the combination of the second design and the second manipulator configuration may offer a more commercializable solution with higher volumes at lower cost with acceptable performance. The precision values for the manipulators, shown in Table 2, were computed by a special calibration method under specific sensor precision. Note that, although the degrees of freedom may share the same class of hardware, they do not share the same precision metrics when arranged into a specific robot kinematic chain. Furthermore, at the micro-nano scale, surface forces play a significant role in modifying the precision of the robot end-effectors. The analytical models in DfM² program account for these variations.

Thus, the DfM² program enables the concurrent design of a product together with the assembly process and the assembly system. It also enables quantitative trade-offs among performance, cost, and cycle time. The designer is not required to make arbitrary guesses about parameters, such as product tolerances or assembler accuracy and repeatability. The DfM² program analyses enable manufacturers to build micro- and nano-scale devices and systems not only at low volumes for specialized applications but also at higher volumes for commercial products at lower labor cost with reduced time and more repeatable performance.

The invention claimed is:

1. A method for optimizing a manufacturing process, the method comprising:
    enabling a user to import or create a three-dimensional model of a product to be manufactured;
    enabling the user to import or create a three-dimensional model of a manufacturing system to be used to manufacture the product;
    enabling the user to select parameters for the product and the manufacturing system; and
    automatically calculating performance metrics for the manufacturing process based upon the user-specified models and parameters, the performance metrics including at least one of process yield, cycle time, overall cost, and product performance.

2. The method of claim 1, wherein enabling a user to import or create a three-dimensional model of a product import or create a three-dimensional model of comprises enabling the user to import or create a three-dimensional model for each part of the product.

3. The method of claim 2, wherein enabling the user to select parameters comprises enabling the user to select tolerances for the parts of the product.

4. The method of claim 1, wherein enabling a user to import or create a three-dimensional model of a manufacturing system comprises enabling the user to import or create a three-dimensional model for each component of the manufacturing system.

5. The method of claim 4, wherein enabling the user to select parameters comprises enabling the user to select precision parameters for the components of the manufacturing system.

6. The method of claim 5, wherein enabling the user to select precision parameters comprises enabling the user to select a speed of motion and a motion error for the components of the manufacturing system.

7. The method of claim 6, wherein automatically calculating performance metrics for the manufacturing process comprises automatically calculating each of process yield, cycle time, overall cost, and product performance for the manufacturing process.

8. The method of claim 7, further comprising enabling the user to define the performance metrics that are used to calculate the product performance.

9. The method of claim 1, wherein the performance metrics are calculated in real time as the user inputs the selected parameters.

10. The method of claim 1, further comprising enabling the user to select fabrication processes to be used to fabricate parts of the product.

11. The method of claim 10, wherein enabling the user to select fabrication processes comprises enabling the user to select from fabrication processes stored in a database.

12. The method of claim 11, wherein precision, cost, and time parameters are stored for each of the stored fabrication processes.

13. The method of claim 1, further comprising enabling the user to select an order of assembly to be performed by the manufacturing system in assembling parts of the product.

14. The method of claim 1, further comprising virtually simulating assembly of the product based upon the user-specified models and parameters.

15. A non-transitory computer-readable medium that stores a manufacturing optimization program, the program comprising:
    logic configured to enable a user to import or create a three-dimensional model of a product to be manufactured;
    logic configured to enable the user to import or create a three-dimensional model of a manufacturing system to be used to manufacture the product;
    logic configured to enable the user to select parameters for the product and the manufacturing system; and
    logic configured to automatically calculate performance metrics for the manufacturing process based upon the user-specified models and parameters, the performance metrics including at least one of process yield, cycle time, overall cost, and product performance.

16. The computer-readable medium of claim 15, wherein the logic configured to enable a user to import or create a three-dimensional model of a product is configured to enable the user to import or create a three-dimensional model for each part of the product.

17. The computer-readable medium of claim 16, wherein the logic configured to enable the user to select parameters is configured to enable the user to select tolerances for the parts of the product.

18. The computer-readable medium of claim 15, wherein the logic configured to enable a user to import or create a three-dimensional model of a manufacturing system is configured to enable the user to import or create a three-dimensional model for each component of the manufacturing system.

19. The computer-readable medium of claim 18, wherein the logic configured to enable the user to select parameters is configured to enable the user to select precision parameters for the parts of the manufacturing system.

20. The computer-readable medium of claim 19, wherein the logic configured to enable the user to select parameters is configured to enable the user to select a speed of motion and a motion error for the components of the manufacturing system.

21. The computer-readable medium of claim 15, wherein the logic configured to automatically calculate performance metrics for the manufacturing process is configured to automatically calculate each of process yield, cycle time, overall cost, and product performance for the manufacturing process.

22. The computer-readable medium of claim 21, further comprising logic configured to enable the user to define the performance metrics that are used to calculate the product performance.

23. The computer-readable medium of claim 15, wherein the logic configured to automatically calculate performance metrics is configured to automatically calculate the performance metrics in real time as the user inputs the selected parameters.

24. The computer-readable medium of claim 15, further comprising logic configured to enable the user to select fabrication processes to be used to fabricate parts of the product.

25. The computer-readable medium of claim 15, further comprising logic configured to enable the user to select an order of assembly to be performed by the manufacturing system in assembling parts of the product.

26. The computer-readable medium of claim 15, further comprising logic configured to virtually simulate assembly of the product based upon the user-specified models and parameters.

* * * * *